United States Patent [19]

Johnson

[11] 4,424,714
[45] Jan. 10, 1984

[54] VORTEX GENERATING DEVICE

[75] Inventor: Archie G. Johnson, Cedar Rapids, Iowa

[73] Assignee: Ford Motor Company, Dearborn, Mich.

[21] Appl. No.: 380,842

[22] PCT Filed: Apr. 9, 1982

[86] PCT No.: PCT/US82/00441

§ 371 Date: Apr. 9, 1982

§ 102(e) Date: Apr. 9, 1982

Related U.S. Application Data

[63] Continuation-in-part of Ser. No. 258,977, Apr. 30, 1981, abandoned.

[51] Int. Cl.³ ............................................. G01F 1/32
[52] U.S. Cl. ................................................. 73/861.22
[58] Field of Search ............ 73/861.22, 861.23, 861.24

[56] References Cited

U.S. PATENT DOCUMENTS

| | | | |
|---|---|---|---|
| 3,940,986 | 3/1976 | Johnson | 73/861.22 |
| 4,312,236 | 1/1982 | Mahany et al. | 73/861.22 |
| 4,312,237 | 1/1982 | Thorne et al. | 73/861.22 |

*Primary Examiner*—Herbert Goldstein
*Attorney, Agent, or Firm*—Peter Abolins; Robert D. Sanborn

[57] ABSTRACT

A narrow generator plate (10) is immersed parallel to the direction of flow in a fluid stream (14) for generating Karman vortices. The generator plate (10) has a shedding section wherein an aperture (26) intersects side surfaces (22) of the generator plate (10) to form leading aperture edges (28) which serve as shedding corners (32). The aperture (26) further intersects a trailing edge (18) of the generator plate (10).

16 Claims, 8 Drawing Figures

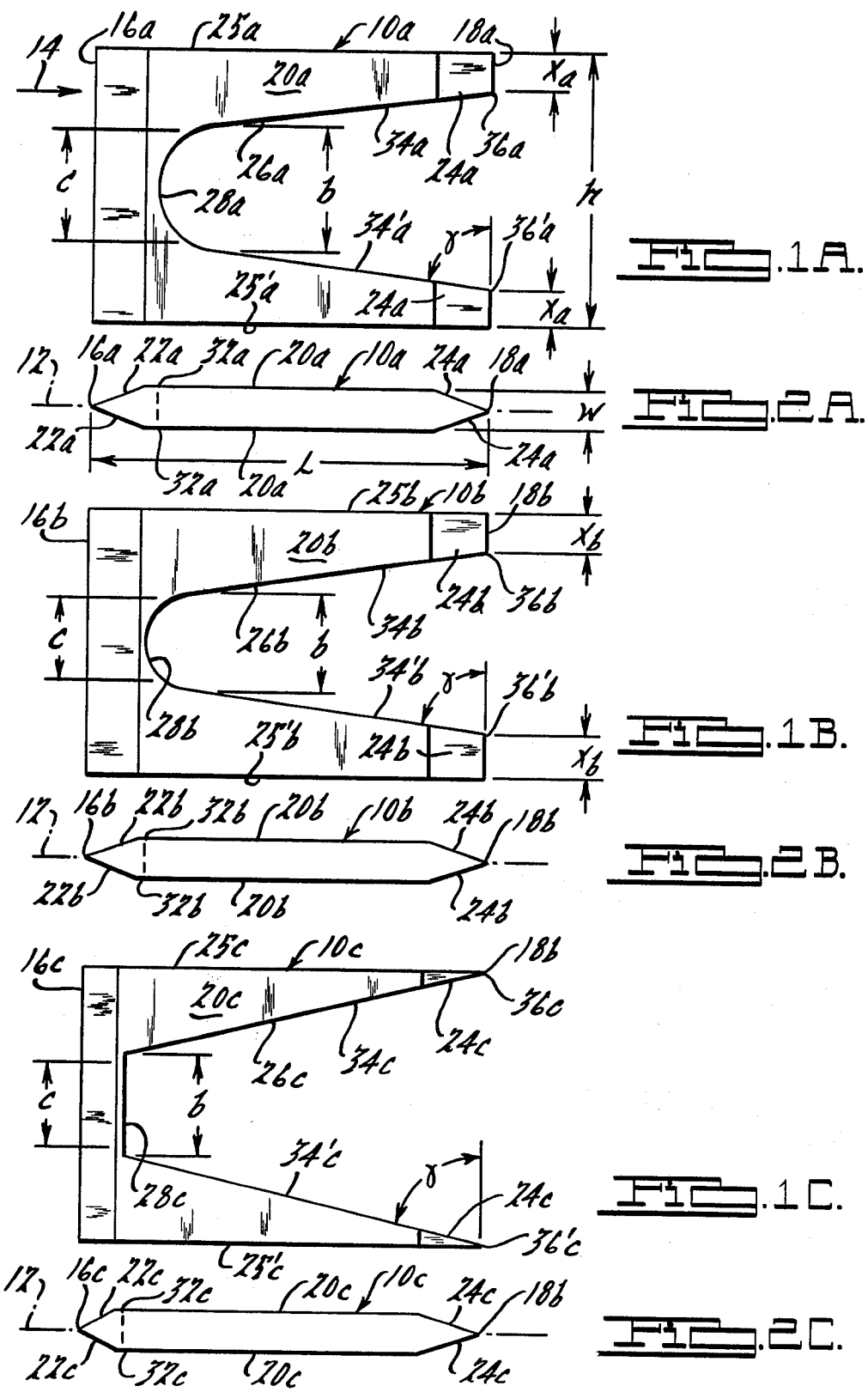

VORTEX GENERATING DEVICE

BACKGROUND ART

This is a continuation-in-part of Ser. No. 258,977 filed Apr. 30, 1981, now abandoned.

TECHNICAL FIELD

Embodiments of the invention hereinafter described pertain to devices for the generation of Karman Vortices.

U.S. patent application Ser. No. 06/108,196, filed Dec. 28, 1979 by Thorne et al, now U.S. Pat. No. 4,312,237 issued Jan. 26, 1982, discloses numerous embodiments of narrow, elongate generator plates used for the generation of Karman vortices in a fluid stream. In one embodiment of the 4,312,237 patent, a generator plate has a shedding section wherein an aperture intersects side surfaces of the generator plate to form a leading aperture edge which serves as a shedding corner for the generation of vortices.

U.S. patent application Ser. No. 06/108,066, filed Dec. 28, 1979 by Mahany et al, now U.S. Pat. No. 4,312,236 issued Jan. 26, 1982, discloses an improvement in the generator plates of the 4,312,237 patent wherein a surface disruption is provided on side surfaces of the generator plate in order to eliminate the occurrence of a boundary-layer transition region which would otherwise occur for a range of fluid flow velocities of interest.

Devices constructed in accordance with the teachings of the aforementioned applications have reliably produced remarkably stable vortices over a wide range of fluid flow rates. These devices have functioned particularly well when operated in accordance with the acoustical techniques disclosed in U.S. Pat. No. 3,680,375 to Joy et al. However, tests conducted with these devices using more sophisticated testing equipment have indicated a very slight signal deviation in a neighborhood of one or two flow rates. When using acoustical techniques, these signal deviations appear to be accompanied by a slight audible whistle. Although the signal deviations are so slight as to be imperceptible—and hence negligible—for practically all environments of usage, nevertheless in some exacting environments elimination of the signal deviations is desirable.

DISCLOSURE OF THE INVENTION

In accordance with principles of this invention, numerous structural embodiments are provided for the generation of Karman vortices. According to one embodiment, a vortex generating device includes a narrow generator plate which is immersed in a fluid flow to generate Karman Vortices. The generator plate is oriented with an axis of elongation parallel to the direction of flow of the fluid stream. The generator plate has side surfaces essentially parallel to the direction of fluid flow. The side surfaces have a shedding region wherein an aperture intersects the side surfaces to form a leading aperture edge which serves as a shedding corner at which vortices detach from the generator plate. The aperture further intersects a trailing edge of the generator plate. The aperture includes the leading aperture edge, which may be either curved or linear, and an aperture portion which extends substantially from the leading aperture edge to a point where it intersects the trailing edge of the generator plate.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 1A, 1B, and 1C are side views of vortex generating devices according to differing embodiments of the invention;

FIGS. 2A, 2B and 2C are top views of FIGS. 1A, 1B, and 1C, respectively;

BEST MODES FOR CARRYING OUT THE INVENTION

Figure 3A:
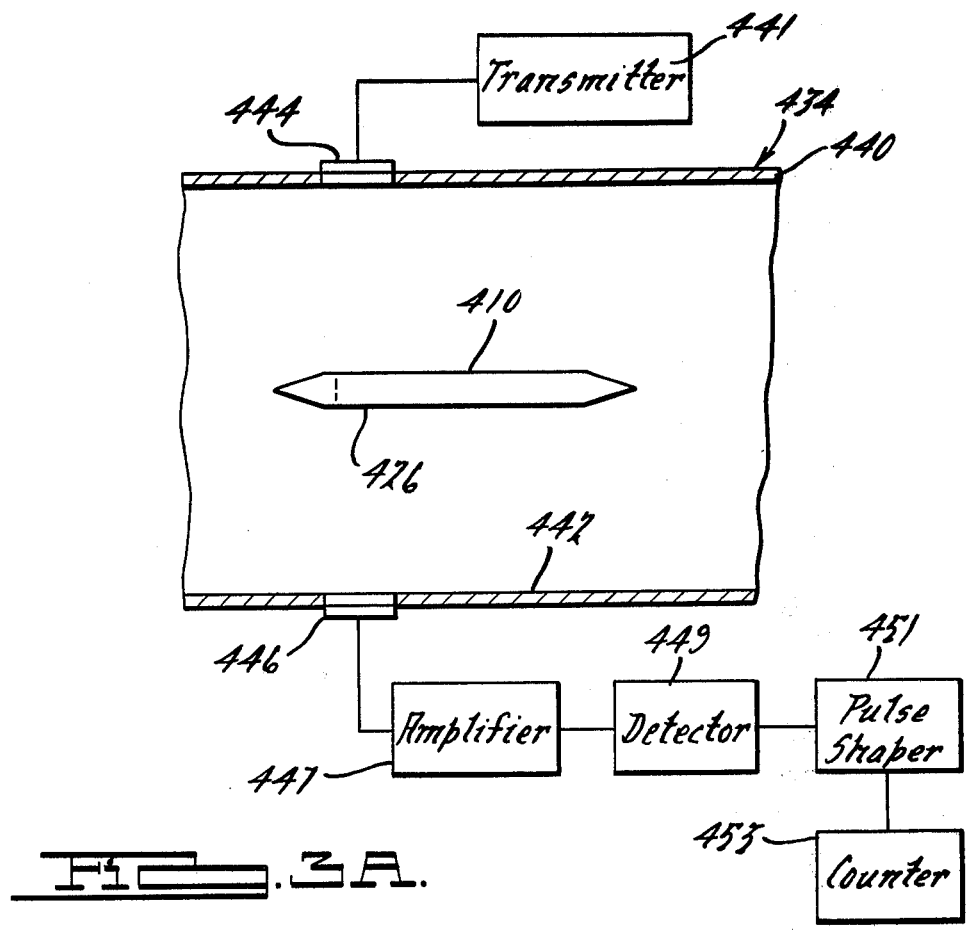
FIG. 3A is a top view of an air flow meter in accordance with an embodiment of this invention including block electronic components coupled to a flow channel with channel walls and sensors for a sonic signal.

FIGS. 1A through 1C illustrate side views of generating devices (such as generator plates 10a through 10c) according to various embodiments of the invention. FIGS. 2A through 2C, in addition to illustrating a top view of FIGS. 1A, 1B, and 1C, respectively, also selectively illustrate an axis of elongation 12 associated with each generator plate 10 of the various embodiments disclosed herein. The axis of elongation 12, and hence each generator plate 10, is oriented parallel to the direction of fluid flow as indicated by arrow 14 (from left to right). It should be understood that in each of the Figures the fluid flows in a direction from the left to the right.

The generator plate 10 of the invention may be fabricated from any suitable material, including plastic or metal. While the generator plate 10 may be mounted in a free standing aerodynamic configuration, it should also be understood that each embodiment of the invention may also be incorporated into a bounded fluid stream, such as a pipe or the like. Advantageously, for improved fluid flow measurement, the generator plate blocks less than 20 percent of the cross-sectional area of the flow channel in a plane perpendicular to the direction of flow.

With respect to the direction of flow, each generator plate has a leading edge 16 and a trailing edge 18. When projected onto the axis of elongation 12, the leading edge 16 of plate 10 is separated from the trailing edge 13 by a length dimension L (shown with reference to FIG. 2A only). Also, as seen in FIG. 2A, each generator plate 10 also has a width W which is essentially perpendicular to the axis of elongation 12. The generator plate 10 is a narrow, elongated member such that the ratio L:W is preferably in the range of 15:1 to 35:1.

Each generator plate 10 has two side surfaces 20 which extend from the leading edge 16 to the trailing edge 18. Althouth the side surfaces 20 are predominantly parallel to the axis of elongation 12 as viewed in FIGS. 2A through 2C, the side surfaces 20 include leading portions 22 and trailing portions 24 (defined with respect to the direction of flow as indicated by arrow 14) which are not necessarily parallel to the axis 12. In the embodiments shown, the leading portions 22 gradually taper inwardly to form the leading edge 16;

the trailing portions 24 gradually taper inwardly to form the trailing edge 18.

Each generator plate 10 has two longitudinal edges 25 which are essentially parallel to the axis of elongation 12. In this respect, each generator plate 10 has a top longitudinal edge 25 and a bottom longitudinal edge 25′. A height dimension h, being orthogonal to both the length dimension L and the width dimension W, separates the longitudinal edges 25 and 25′ at the trailing edge 18 (shown with reference to FIG. 1A only).

The generator plates 10 of the different embodiments of the invention have a shedding section including a portion of an aperture 26 which intersects the side surfaces 20 and extend into the plate 10 along the width dimension W. Although the aperture 26 may take on numerous geometrical shapes, the aperture 26 of each embodiment has a leading aperture edge 28 with respect to the direction of flow as indicated by arrow 14. The leading aperture edges 28 intersect the side surfaces 20 of the plate 10 to form shedding corners 32 which are preferably sharp as seen from above in FIGS. 2A through 2C. As seen from the side in FIGS. 1A through 1C, the leading aperture edges 28 are preferably continuous without any discontinuities.

In each of the embodiments of FIGS. 1A through 1C the shedding corners 32 effectivly extend along the leading aperture edge 28 for only a portion thereof, such that the effective shedding length of the leading aperture edge 28 (as projected on the height dimension h) is a length c. Although length c varies with each embodiment, it is preferred that in each embodiment c should be less than the length of the projection of the leading aperture edge 28 on the height dimension h (denoted as b).

In each of the embodiments of FIGS. 1A through 1C the aperture 26 includes two portions 34, 34′ which extend rearwardly (downstream with respect to the direction of flow) from extreme portions of the aperture leading edge 28 to points of intersection 36, 36′ on the trailing edge 18. In this respect, extending portion 34 (the "upper extending portion") extends from an upper extreme of the aperture leading edge 28 to point 36 near the top longitudinal edge 25. Extending portion 36′ (the "lower extending portion"), on the other hand, extends from a lower extreme of the apertured leading edge 28 to point 36′ near the bottom longitudinal edge 25′.

As mentioned above, the aperture 26 may take on numerous geometrical shapes. Two shapes of aperture 26 are shown in FIGS.: FIGS. 1A and 1B illustrate apertures 26a, 26b having essentially semi-circular leading aperture edges 28a, 28b; FIG. 1C illustrates an aperture 26 having an essentially linear leading aperture edge 28C. The extending portions 34 shown in each embodiment are essentially linear.

As described above, the extending portions 34, 34′ intersect the trailing edges 18 at points 36, 36′. For the embodiments shown in FIGS. 1A and 1B, points 36 and 36′ are each separated from their respective nearly longitudinal edges 25, 25′ by a distance x. Depending on the environment of use the value of x should generally be less than h/3, and preferably in the neighborhood of h/8. That is, x should generally be less than one-third, and preferably about one-eighth, the height of the generator plate 10. For example, in the case where x=h/8, should the generator plate 10a of FIG. 1A have a height of 2 inches, the value of x would preferably 0.25 inch.

For each of the embodiments shown in FIGS. 1A through 1C, the extending portions 34, 34′ of aperture 26 each intersect the trailing edge 18 of the generator plate 10 at an interior angle denoted by the Greek letter gamma ($\gamma$). Preferably, the value of $\gamma$ lies in the range from 65° to 87°.

Any of the afore-described embodiments of the invention may be utilized as a free standing aerodynamic configuration or may be incorporated into a flow channel. In the latter regard, the embodiments of the invention may be employed in channel flow meters in the manner discussed in U.S. Pat. Nos. 4,312,236 and 4,312,237, referenced above and incorporated herein by reference. It should be understood that other aspects of the patents, such as other structural features and ranges of dimensional ratios, are applicable to various embodiments of the present invention. For example, alternate embodiments of the present invention include the following features of the incorporated patents; various configurations for the manner of intersection of the leading portions 22; various geometrical configurations of the leading aperture edges 28; and, various types of surface disruption on the side surfaces 22. Advantageously, the vortex generator plate blocks less than twenty percent of the cross sectional area of the flow channel in a plane perpendicular to the direction of flow (see FIG. 3A).

Although applicant is unable to provide any exacting explanation of the phenomena resulting in the improvement, vortex generators constructed in accordance with the foregoing overcome the detected signal deviations of the prior art.

Figure 3B:
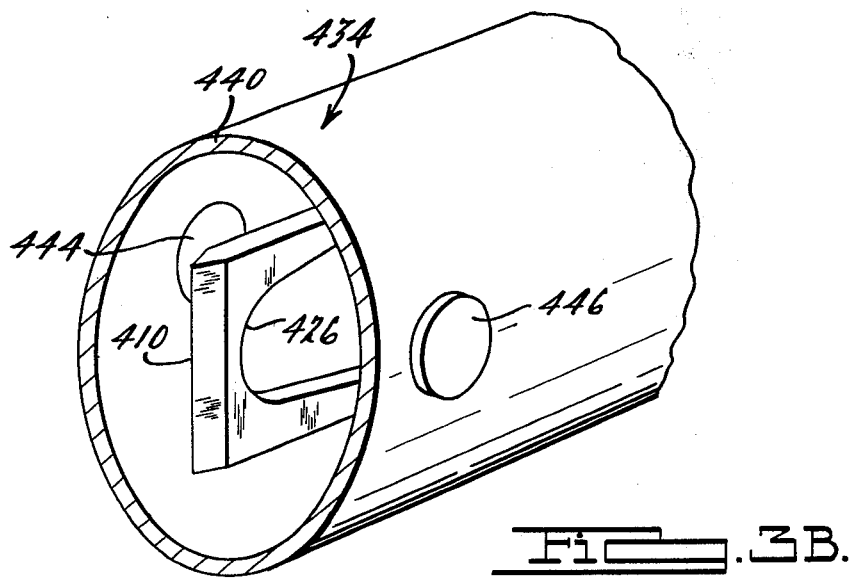
FIG. 3B is a perspective view of the air flow meter of FIG. 3A.

Referring to FIGS. 3A and 3B, flow channel 434 has a first channel wall 440 and a second channel wall 442 which are both parallel to the direction of fluid flow and which face each other. Mounted in the first channel wall 440 is a transmitting transducer 444; mounted in the second channel wall 442 is a receiving transducer 446. The transducers 444 and 446 are mounted in the opposing channel walls such that a signal traveling between the transducers 444, 446 would pass through an aperture 426 of a generator plate 410. The transmitting transducer 444 and the receiving transducer 446 are connected to suitable electrical circuitry for determining the relative velocity between the fluid stream and the generator plate 410.

Referring to FIG. 3A, the electronics for the vortex air flow meter include a transmitter 441, transmitting transducer 444, receiving transducer 445, an amplifier 447, a detector 449, a pulse shaper 451 and a counter 453. The transmitter 441 generates a sonic signal and applies it to transmitting transducer 444 via a suitable connecting wire. The sonic signal generated by the transmitting transducer 444 passes through the wake of generator plate 410 and is modulated by the fluctuating flow field formed in the wake of generator plate 410 by the generation of a Karman vortex street. The modulated sonic signal is received by the receiving transducer 446 and applied to amplifier 447 via a suitable connecting wire. The amplified signal is, in turn, applied to detector 449 which in essence is a demodulator that detects a demodulation signal and generates pulses at the modulation frequency. The pulses are shaped by pulse shaper 451 and applied to the counter 453 whose count is related to the relative velocity in accordance with known formula.

While the invention has been particularly shown and described with reference to the preferred embodiments thereof, it will be understood by those skilled in the art that various alterations in form and detail may be made therein without departing from the spirit and scope of the invention.

INDUSTRIAL APPLICABILITY

This invention has various industrial applications including but not limited to, the measurement of air flow coming into an internal combustion engine and provide a signal for use by electronic engine controls governing engine operation. In particular, the measurement of the air flow can be used to govern the air fuel ratio supplied to the internal combustion engine.

I claim:

1. A device for generating Karman vortices in a fluid stream, said device comprising:
   a narrow elongate plate member having an axis of elongation parallel to the direction of flow of said fluid stream, said elongate plate member having a leading edge and a trailing edge with respect to said direction of flow, said elongate plate member having side surfaces spanning said leading edge and said trailing edge, said side surfaces being essentially parallel to said direction of flow, said elongate plate member also having at least one aperture, said aperture intersecting at least one said side surface to form at said side surface a leading aperture edge with respect to said direction of flow such that said leading aperture edge forms a shedding corner for the generation of vortices, and wherein said aperture further intersects said trailing edge of said elongate plate member.

2. The device of claim 1, wherein said aperture includes an aperture portion which extends from said leading aperture edge to intersect said trailing edge of said elongate plate member.

3. The device of claim 2, wherein said extending portion of said aperture is essentially linear along said side surface.

4. The device of claims 2 or 3 wherein said elongate plate member has two longitudinal edges essentially parallel to said axis of elongation, wherein a height h separates said longitudinal edges at said trailing edge, and wherein said extending portion of said aperture intersects said trailing edge of said elongate plate member at a point h/8 from the nearer longitudinal edge of said plate member.

5. The device of claims 2 or 3, wherein said extending portion of said aperture intersects said trailing edge of said elongate plate member at an interior angle, said interior angle having a value ranging from 65° to 87°.

6. The device of claims 1 or 2, wherein said leading aperture edge is essentially semi-circular.

7. The device of claims 1 or 2 wherein said leading aperture edge is essentially linear.

8. The device of claim 1 wherein said aperture extends substantially through said plate member.

9. The device of claim 1, wherein said device is located in a flow channel such that said axis of elongation of said plate member is parallel to said direction of flow, and wherein said device blocks less than 20 percent of the cross-sectional area of the flow channel in a plane perpendicular to the direction of flow.

10. The device of claim 1, wherein said side surfaces of said plate member having leading portions with respect to said direction of flow, wherein said leading portions of said side surfaces of said plate member intersect so as to form an essentially sharp leading edge of said plate and wherein said leading portions of said side surfaces gradually taper inwardly to said leading edge.

11. The device of claim 1, wherein said side surfaces of said plate member have leading portions with respect to said direction of flow, wherein said leading portions of said side surfaces intersect said axis of elongation at a specified angle.

12. The device of claim 1, wherein said side surfaces of said plate member have leading portions with respect to said direction of flow, wherein a leading portion of one side surface intersect a leading portion of a second side surface at a specified angle.

13. The device of claim 1, wherein said elongate plate member has a width W perpendicular to said axis of elongation, wherein said plate member has a length L as projected on said axis of elongation, and wherein the ratio L:W is in the range of 15:1 to 35:1.

14. The device of claim 1, wherein said side surfaces of said elongate plate member have trailing portions with respect to said direction of flow, and wherein said trailing portions of said side surfaces are tapered toward one another.

15. The device of claim 1, wherein said device is located in a flow channel comprising channel walls parallel to said direction of flow, and wherein at least one of said channel walls has mounted therein a sensor for directing a signal through said aperture.

16. The device of claim 15, wherein each of said channel walls have mounted therein a transducer, a first such channel wall having mounted therein a transmitting transducer and a second such channel wall having mounted therein a receiving transducer, wherein said transmitting transducers directs a sonic signal modulated by said vortices.

* * * * *